United States Patent
Morisaki

(10) Patent No.: US 10,661,778 B2
(45) Date of Patent: May 26, 2020

(54) HYBRID VEHICLE AND CONTROLLER FOR HYBRID VEHICLE HAVING A POWER STORAGE CAPACITY DECREASING CONTROL

(71) Applicant: Toyota Jidosha Kabushiki Kaisha, Toyota-shi, Aichi-ken (JP)

(72) Inventor: Keisuke Morisaki, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 16/146,037

(22) Filed: Sep. 28, 2018

(65) Prior Publication Data

US 2019/0168735 A1    Jun. 6, 2019

(30) Foreign Application Priority Data

Dec. 5, 2017  (JP) .................................. 2017-233642

(51) Int. Cl.
  *B60W 20/12* (2016.01)
  *B60W 20/11* (2016.01)
  (Continued)

(52) U.S. Cl.
  CPC ............. *B60W 20/12* (2016.01); *B60K 6/445* (2013.01); *B60W 10/06* (2013.01); *B60W 10/08* (2013.01);
  (Continued)

(58) Field of Classification Search
  CPC ...... B60W 20/12; B60W 20/13; B60W 20/14; B60W 20/15; B60W 20/16; B60W 20/20;
  (Continued)

(56) References Cited

U.S. PATENT DOCUMENTS

2010/0006359 A1*  1/2010  Ang ........................ B60K 6/445
                                              180/65.285
2012/0310462 A1   12/2012  Kuroda et al.
(Continued)

FOREIGN PATENT DOCUMENTS

EP        2067677 A1    6/2009
JP        2009-001049 A 1/2009
(Continued)

*Primary Examiner* — Anne Marie Antonucci
*Assistant Examiner* — Andrew J Cromer
(74) *Attorney, Agent, or Firm* — Dinsmore & Shohl LLP

(57) ABSTRACT

A hybrid vehicle including: an engine; a motor; a power storage device; and a control device configured to: i) automatically start and stop the engine; ii) execute, in a current trip, a power storage capacity decreasing control of controlling the engine and the motor such that a power storage capacity of the power storage device in a case where the hybrid vehicle is predicted to be parked at a predetermined point is lower than that in a case where the hybrid vehicle is predicted to not be parked at the predetermined point, and execute, in a next trip, a power storage capacity recovering control; and iii) limit execution of the power storage capacity decreasing control when the hybrid vehicle is predicted to be parked at the predetermined point is predicted and a stopping prohibiting condition for the engine is satisfied.

18 Claims, 7 Drawing Sheets

(51) Int. Cl.
| | |
|---|---|
| *B60W 10/06* | (2006.01) |
| *B60W 20/13* | (2016.01) |
| *B60W 10/08* | (2006.01) |
| *B60W 50/00* | (2006.01) |
| *B60W 10/26* | (2006.01) |
| *B60W 20/16* | (2016.01) |
| *B60W 30/194* | (2012.01) |
| *B60K 6/445* | (2007.10) |
| *F02N 11/08* | (2006.01) |
| *F02N 11/04* | (2006.01) |

(52) U.S. Cl.
CPC ............ *B60W 10/26* (2013.01); *B60W 20/11* (2016.01); *B60W 20/13* (2016.01); *B60W 20/16* (2016.01); *B60W 30/194* (2013.01); *B60W 50/0097* (2013.01); *B60W 2510/068* (2013.01); *B60W 2510/244* (2013.01); *B60W 2520/10* (2013.01); *B60W 2530/12* (2013.01); *B60W 2530/14* (2013.01); *B60W 2530/18* (2013.01); *B60W 2540/10* (2013.01); *B60W 2556/50* (2020.02); *B60W 2556/55* (2020.02); *B60W 2710/244* (2013.01); *B60W 2900/00* (2013.01); *F02N 11/04* (2013.01); *F02N 11/0825* (2013.01); *F02N 11/0829* (2013.01); *F02N 2011/0896* (2013.01); *F02N 2200/046* (2013.01); *F02N 2200/061* (2013.01); *F02N 2200/123* (2013.01); *F02N 2300/2011* (2013.01)

(58) Field of Classification Search
CPC ...... B60W 20/30; B60W 20/11; B60W 10/08; B60W 2510/244; B60W 20/00
See application file for complete search history.

(56) References Cited

U.S. PATENT DOCUMENTS

| | | | |
|---|---|---|---|
| 2014/0288743 A1* | 9/2014 | Hokoi | B60W 20/40 701/22 |
| 2015/0094894 A1* | 4/2015 | Ito | B60L 58/12 701/22 |
| 2017/0120888 A1* | 5/2017 | Jinno | B60W 10/06 |

FOREIGN PATENT DOCUMENTS

| | | |
|---|---|---|
| JP | 2012-153257 A | 8/2012 |
| JP | 2013-074706 A | 4/2013 |
| JP | 2014-184892 A | 10/2014 |
| JP | 2017-081416 A | 5/2017 |

* cited by examiner

HYBRID VEHICLE AND CONTROLLER FOR HYBRID VEHICLE HAVING A POWER STORAGE CAPACITY DECREASING CONTROL

CROSS-REFERENCE TO RELATED APPLICATIONS

This application claims priority to Japanese Patent Application No. 2017-233642 filed on Dec. 5, 2017 including the specification, drawings and abstract is incorporated herein by reference in its entirety.

BACKGROUND

1. Technical Field

The disclosure relates to a hybrid vehicle and a controller for the hybrid vehicle, and more particularly, to a hybrid vehicle including an engine, a motor, and a power storage device and a controller for the hybrid vehicle.

2. Description of Related Art

A hybrid vehicle including an engine, a motor, and a battery and controlling the engine and the motor such that the vehicle travels while a state of charge of the battery becomes a target state of charge has been proposed. In this hybrid vehicle, the target state of charge of the battery is changed from a basic target state of charge to a special target state of charge less than the basic target state of charge in a traveling route of the hybrid vehicle when the hybrid vehicle has reached a point a predetermined distance before a parking point (a destination). A parking duration at the parking point is predicted to be longer than a predetermined period of time. The target state of charge is returned to the basic target state of charge, when the hybrid vehicle restarts from the parking point in a next trip (for example, see Japanese Unexamined Patent Application Publication No. 2017-81416 (JP 2017-81416 A)). In such a hybrid vehicle, the state of charge of the battery at the time of restarting from the parking point can be set to be satisfactorily lower than the basic target state of charge (to the vicinity of the special target state of charge) through such control. Accordingly, at the time of engine running (cold running) additionally serving as warm-up, a load is applied to the engine to enhance charging (cold charging) efficiency of the battery.

SUMMARY

In the above-mentioned hybrid vehicle, the target state of charge of the battery is changed from the basic target state of charge to the special target state of charge to decrease the state of charge of the battery. When stopping of the engine is prohibited and the state of charge of the battery is decreased, there is a likelihood of a problem being caused. When an engine stopping prohibiting condition, in which the engine is predicted to operate continuously over a relatively long time, has been satisfied after the engine has been started, if the hybrid vehicle intends to decrease the state of charge of the battery, there is a likelihood that a period of time in which the engine operates at an operating point with a light load and poor efficiency will increase and vehicle efficiency will decrease. When heavy-load traveling is performed while a state in which the state of charge of the battery has been decreased is maintained, there is a likelihood that the period of time in which the engine operates at an operating point with poor efficiency will increase and vehicle efficiency will decrease.

The disclosure provides a hybrid vehicle that can restrain occurrence of a problem due to execution of control of decreasing a power storage capacity of a power storage device and a controller for the hybrid vehicle.

An aspect of the present disclosure relates to a hybrid vehicle including: an engine; a motor; a power storage device configured to supply electric power to the motor and to be charged with electric power generated by the motor; and a control device configured to: i) automatically start and stop the engine; ii) execute, in a current, trip, a power storage capacity decreasing control of controlling the engine and the motor such that a power storage capacity of the power storage device in a case where the hybrid vehicle is predicted to be parked at a predetermined point is lower than a power storage capacity of the power storage device in a case where the hybrid vehicle is predicted to not be parked at the predetermined point, and execute, in a next trip, a power storage capacity recovering control of controlling the engine and the motor such that the power storage capacity of the power storage device is recovered when the engine operates; and iii) limit execution of the power storage capacity decreasing control when the hybrid vehicle is predicted to be parked at the predetermined point is predicted and a stopping prohibiting condition for the engine is satisfied.

In the above aspect, automatic starling and automatic stopping of the engine are performed, and when parking at a predetermined point is predicted, the power storage capacity decreasing control of controlling the engine and the motor such that the power storage capacity of the power storage device is lower than that when parking at the predetermined point is not predicted is executed in the current trip, and the power storage capacity recovering control of controlling the engine and the motor such that the power storage capacity of the power storage device is recovered when the engine operates is executed in the next trip. When parking at the predetermined point is predicted and the stopping prohibiting condition for the engine is satisfied, execution of the power storage capacity decreasing control is limited. Accordingly, it is possible to restrain occurrence of a problem due to execution of the power storage capacity decreasing control, for example, a decrease in vehicle efficiency. Here, the "stopping prohibiting condition for the engine" may be a condition that the engine is predicted to operate continuously over a predetermined period of time. The "limiting of execution of the power storage capacity decreasing control" includes execution of second power storage capacity decreasing control of limiting a decrease in power storage capacity of the power storage device compared with the power storage capacity decreasing control and prohibition of execution of the power storage capacity decreasing control.

In the above aspect, the control device may be configured to not execute the power storage capacity decreasing control when the hybrid vehicle is predicted to be parked at the predetermined point and the stopping prohibiting condition is satisfied.

According to this configuration, it is possible to further restrain occurrence of a problem due to execution of the power storage capacity decreasing control.

In the above aspect, the stopping prohibiting condition may include a condition that a warm-up request for the engine or a warm-up request for a catalyst which is attached to an exhaust system of the engine to clean exhaust gas has been issued.

In the above aspect, the stopping prohibiting condition may include a condition that a regeneration request for a filter which is attached to an exhaust system of the engine to reduce the amount of particulate matter in exhaust gas has been issued.

In the above aspect, the stopping prohibiting condition may include a condition that an abnormality diagnosis executing condition for the engine has been satisfied.

In the above aspect, the stopping prohibiting condition may include a condition that an output priority mode in which greater priority is given to responsiveness than to fuel efficiency is instructed.

According to this aspect, when a warm-up request for the engine has been issued, when a warm-up request for a catalyst has been issued, when a regeneration request for a filter has been issued, when an abnormality diagnosis request for the engine has been issued, or when an output priority mode has been instructed, it is possible to restrain occurrence of a problem due to execution of the power storage capacity decreasing control.

In the above aspect, the stopping prohibiting condition may include a condition that a parameter associated with a traveling output of a vehicle is equal to or greater than a threshold value; and the control device may be configured to not limit execution of the power storage capacity decreasing control when the hybrid vehicle is predicted to be parked at the predetermined point and the parameter is equal to or greater than the threshold value.

Here, examples of the "parameter" include an accelerator operation amount, a vehicle speed, a required output (torque and power), and an actual output (torque and power).

In the above aspect, the stopping, prohibiting condition may include a condition that a heating request for a passenger compartment using the engine as a heat source has been issued; and the control device may be configured to not limit execution of the power storage capacity decreasing control when the hybrid vehicle is predicted to be parked at the predetermined point and the heating request has been issued.

According to this configuration, when the parameter is equal to or greater than a threshold value or a heating request has been issued and thus the stopping prohibiting condition has been satisfied, it is possible to execute the power storage capacity decreasing control.

In the above aspect, the control device may be configured to: i) determine whether parking at the predetermined point is predicted based on whether a destination is the predetermined point; and ii) acquire a destination which is predicted based on a traveling history by an external system when the destination has not been set by a user.

According to this configuration, even when a destination has not been set by a user, it is possible to determine whether parking at the predetermined point is predicted by acquiring a predicted destination form an external system (for example, a cloud server).

In the above aspect the power storage device may be configured to not be charged with electric power from an external power supply outside the hybrid vehicle.

In the above aspect, the power storage device may be configured to be charged with electric power from an external power supply outside the hybrid vehicle; and the predetermined point may be a position at which the power storage device is predicted to not be charged with electric power from an external power supply outside the hybrid vehicle.

According to this configuration, when external charging is performed during parking at the predetermined point, there is low necessity for execution of the power storage capacity decreasing control before parking at the predetermined point.

Another aspect of the present disclosure relates to a controller for a hybrid vehicle, the hybrid vehicle including an engine, a motor, and a power storage device configured to supply electric power to the motor and to be charged with electric power generated by the motor, the controller comprising: an electronic control unit configured to i) automatically start and stop the engine; ii) execute, in a current trip, a power storage capacity decreasing control of controlling the engine and the motor such that a power storage capacity of the power storage device in a case where the hybrid vehicle is predicted to be parked at a predetermined point is lower than a power storage capacity of the power storage device in a case where the hybrid vehicle is predicted to not be parked at the predetermined point, and execute, in a next trip, a power storage capacity recovering control of controlling the engine and the motor such that the power storage capacity of the power storage device is recovered when the engine operates; and iii) limit execution of the power storage capacity decreasing control when the hybrid vehicle is predicted to be parked at the predetermined point is predicted and a stopping prohibiting condition for the engine is satisfied.

According to the above aspect automatic stalling and automatic stopping of the engine are performed, and when parking, at a predetermined point is predicted, the power storage capacity decreasing control of controlling the engine mid the motor such that the power storage capacity of the power storage device is lower than that when parking at the predetermined point is not predicted is executed in the current trip, and the power storage capacity recovering control of controlling the engine and the motor such that the power storage capacity of the power storage device is recovered when the engine operates is executed in the next trip. When parting at the predetermined point is predicted and the stopping prohibiting condition for the engine is satisfied, execution of the power storage capacity decreasing control is limited. Accordingly, it is possible to restrain occurrence of a problem due to execution of the power storage capacity decreasing control, for example, a decrease in vehicle efficiency. Here, the "stopping prohibiting condition for the engine" may be a condition that the engine is predicted to operate continuously over a predetermined period of time. The "limiting of execution of the power storage capacity decreasing control" includes execution of second power storage capacity decreasing control of limiting a decrease in power storage capacity of the power storage device compared with the power storage capacity decreasing control and prohibition of execution of the power storage capacity decreasing control.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Hereinafter, an embodiment of the disclosure will be described with reference to the accompanying drawings.

Figure 1:
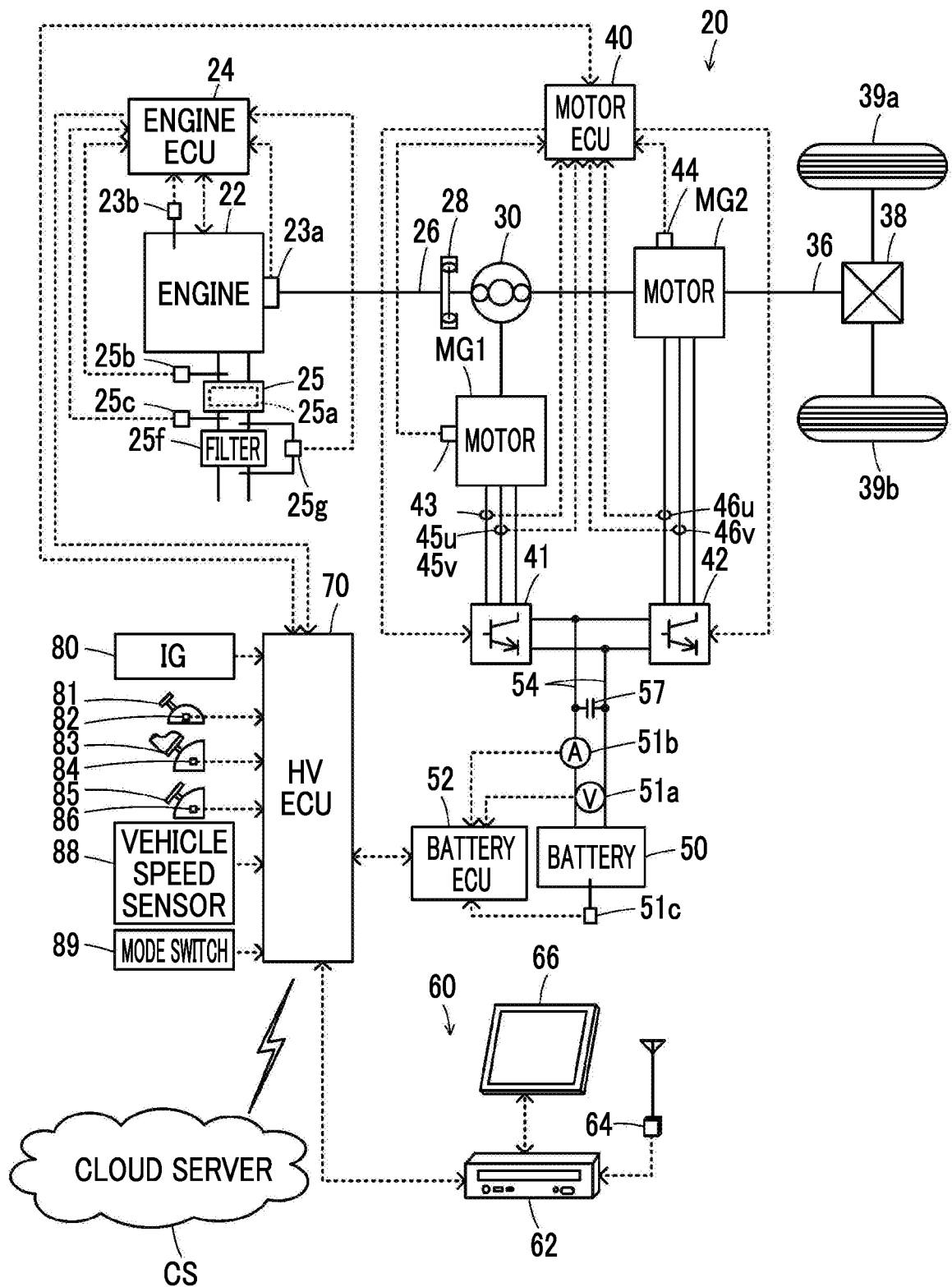
FIG. 1 is a diagram schematically illustrating a configuration of a hybrid vehicle 20 according to an embodiment of the disclosure.

FIG. 1 is a diagram schematically illustrating a configuration of a hybrid vehicle 20 according to an embodiment of the disclosure. As illustrated in the drawing, the hybrid vehicle 20 according to the embodiment includes an engine 22, a planetary gear 30, motors MG1 and MG2, inverters 41 and 42, a battery 50 as a power storage device, an onboard navigation device 60, and a hybrid electronic control unit (hereinafter referred to as an "HVECU") 70.

The engine 22 is configured as an internal combustion engine that outputs power using gasoline, diesel fuel, or the like as fuel and is connected to a carrier of a planetary gear 30 via a damper 28. A cleaner 25 and a particulate matter removing filter (hereinafter referred to as a "PM filter") 25f are attached to an exhaust system of the engine 22. The cleaner 25 includes a catalyst 25a that reduces the amount of non-combusted fuel or nitrogen oxides in exhaust gas from the engine 22. The PM filter 25f is formed as a porous filter out of ceramics, stainless steel, or the like and captures particulate matter (PM) such as soot in the exhaust gas. Operation of the engine 22 is controlled by an engine electronic control unit (hereinafter referred to as an "engine ECU") 24.

Although not illustrated in the drawing, the engine ECU 24 is configured as a microprocessor such as a CPU, and includes a ROM that stores a processing program, a RAM that temporarily stores data, input and output ports, and a communication port in addition to the CPU. Signals from various sensors which are required for controlling operation of the engine 22 are input to the engine ECU 24 via the input port. Examples of the signals input to the engine ECU 24 include a crank angle θcr from a crank position sensor 23a that detects a rotational position of a crank shaft 26 of the engine 22 and a coolant temperature Tw from a coolant temperature sensor 23b that detects a temperature of a coolant of the engine 22. Examples of such signals further include an air-fuel ratio AF from an air-fuel ratio sensor 25b that is attached to a part in the exhaust system of the engine 22 upstream from the cleaner 25 and an oxygen signal O2 from an oxygen sensor 25c that is attached to a part in the exhaust system of the engine 22 downstream from the cleaner 25. Examples of such signals further include a pressure difference ΔP from a pressure difference sensor 25g that detects a pressure difference before and after the PM filter 25f (a pressure difference between upstream and downstream). Various control signals for controlling operation of the engine 22 are output from the engine ECU 24 via the output port. The engine ECU 24 is connected to the HVECU 70 via the communication port. The engine ECU 24 calculates a rotation speed Ne of the engine 22 based on the crank angle θcr from the crank position sensor 23a or calculates (estimates) a temperature (a catalyst temperature) Tc of the catalyst 25a based on the coolant, temperature Tw from the coolant temperature sensor 23b. The engine ECU 24 calculates a volumetric efficiency (a ratio of an air volume actually input in one cycle to a stroke volume in one cycle of the engine 22) KL based on an amount of intake air Qa from an air flow meter (not illustrated) and the rotation speed Ne of the engine 22. The engine ECU 24 calculates a PM deposition amount Qpm as an amount of particulate matter deposited in the PM filter 25 based on the pressure difference ΔP from the pressure difference sensor 25g or calculates a temperature tf of the PM filter 25f based on the rotation speed Ne of the engine 22 or the volumetric efficiency KL.

The planetary gear 30 is configured as a single pinion type planetary gear mechanism. A rotor of the motor MG1 is connected to a sun gear of the planetary gear 30. A drive shaft 36 connected to driving wheels 39a and 39b via a differential gear 38 is connected to a ring gear of the planetary gear 30. The crank shaft 26 of the engine 22 is connected to a carrier of the planetary gear 30 via the damper 28 as described above.

The motor MG1 is configured, for example as a synchronous generator motor and the rotor thereof is connected to the sun gear of the planetary gear 30 as described above. The motor MG2 is configured, for example as a synchronous generator motor and a rotor thereof is connected to the drive shaft 36. The inverters 41 and 42 are used to drive the motors MG1 and MG2 and are connected to the battery 50 via power lines 54. A smoothing capacitor 57 is attached to the power lines 54. The motors MG1 and MG2 are rotationally driven by causing a motor electronic control unit (hereinafter referred to as a "motor ECU") 40 to control switching of a plurality of switching elements which are not illustrated in the inverters 41 and 42.

Although not illustrated in the drawing, the motor ECU 40 is configured as a microprocessor such as a CPU, and includes a ROM that stores a processing program, a RAM that temporarily stores data, input and output ports, and a communication port in addition to the CPU. Signals from various sensors which are required for controlling operation of the motors MG1 and MG2, for example, rotational positions θm1 and θm2 from rotational position sensors 43 and 44 that detect rotational positions of the rotors of the motors MG1 and MG2 and phase currents Iu1, Iv1, Iu2, and Iv2 from current sensors 45u, 45v, 46u, and 46v that detect currents flowing by phases in the motors MG1 and MG2, and a temperature tm2 from a temperature sensor that detects the temperature of the motor MG2, are input to the motor ECU 40 via the input, port. Switching control signals to the plurality of switching elements of the inverters 41 and 42 and the like are output from the motor ECU 40 via the output port. The motor ECU 40 is connected to the HVECU 70 via the communication port. The motor ECU 40 calculates electrical angles θe1 and θe2, angular velocities ωm1 and ωm2, or rotation speeds Nm1 and Nm2 of the motors MG1 and MG2 based on the rotational positions θm1 and θm2 of the rotors of the motors MG1 and MG2 from the rotational position sensors 43 and 44.

The battery 50 is configured, for example, as a lithium-ion secondary battery or a nickel-hydride secondary battery and is connected to the power lines 54. The battery 50 is controlled by a battery electronic control unit (hereinafter referred, to as a "battery ECU") 52.

Although not illustrated in the drawing, the battery ECU 52 is configured as a microprocessor such as a CPU, and includes a ROM that stores a processing program, a RAM that temporarily stores data, input and output ports, and a communication port in addition to the CPU. Signals from various sensors which are required for controlling the battery 50 are input to the battery ECU 52 via the input port. Examples of the signals input to the battery ECU 52 include a voltage Vb of the battery 50 from a voltage sensor 51a that is attached between the terminals of the battery 50, a current Ib of the battery 50 from a current sensor 51b that is attached to the output terminal of the battery 50, and a temperature Tb of the battery 50 from a temperature sensor 51c that is attached to the battery 50. The battery ECU 52 is connected to the HVECU 70 via the communication port. The battery ECU 52 calculates a power storage capacity SOC based on an integrated value of the current Ib of the battery 50 from the current sensor 51b or calculates input and output limits Win and Wont based on the calculated power storage capacity SOC and the temperature Tb of the battery 50 from the temperature sensor 51c. The power storage capacity SOC refers to a ratio of the capacity of electric power which can be discharged from the battery 50 to the total capacity of the battery 50. The input and output limits Win and Wout are allowable charging and discharging powers with which the battery 50 can be charged and discharged. The input and output limits Win and Wout of the battery 50 can be set to, for example, values obtained by setting basic values Wintmp and Wouttmp of the input and output limits Win and Wout based on the temperature Tb of the battery 50, setting correction Coefficients kin and kout based on the power storage capacity SOC of the battery 50, and multiplying the basic values Wintmp and Wouttmp by the coefficients kin and kout. Specifically, the output limit Wout of the battery 50 decreases as the temperature Tb of the battery 50 moves to a higher side or a lower side from an allowable temperature range, and decreases as the power storage capacity SOC of the battery 50 decreases. The input limit Win of the battery 50 increases (the absolute value thereof decreases) as the temperature Tb of the battery 50 moves to a higher side or a lower side from the allowable temperature range, and increases (the absolute value thereof decreases) as the power storage capacity SOC of the battery 50 increases.

The onboard navigation device 60 includes a main body 62 that has a storage medium such as a hard disk in which map information or the lake is stored or a control unit including input and output ports and a communication port built therein, a GPS antenna 64 that receives information on a current location of the vehicle, and a touch panel type display 66 that displays the information of the current location of the vehicle, a scheduled traveling route to a destination, or the like and can receive various instructions from a user. In the map information, service information (for example, sightseeing information or parking lots), road information of predetermined traveling sections (for example, between traffic, signs or between intersections), and the like are stored as a database. The road information includes distance information, road width information, lane number information, region information (downtown or outskirt), road type information (regular roads, expressways, or toil roads), gradient information, legal speed limits, and the number of signals. The onboard navigation device 60 is connected to the HVECU 70 via the communication port.

When the display 66 is operated to set a destination by a user, the onboard navigation device 60 sets a scheduled traveling route from a current location to a destination of the vehicle based on the map information and the current location and the destination of the vehicle, and displays the set scheduled traveling route on the display 66 to perform route guidance.

Although not illustrated in the drawing, the HVECU 70 is configured as a microprocessor such as a CPU, and includes a ROM that stores a processing program, a RAM that temporarily stores data, input and output ports, and a communication port in addition to the GPU. Signals front various sensors are input to the HVECU 70 via the input port. Examples of the signals input to the HVECU 70 include an ignition signal from an ignition switch 80 and a shift position SP from a shift position sensor 82 that detects an operation position of a shift lever 81. Examples thereof further include an accelerator operation amount Acc from an accelerator pedal position sensor 84 that detects an amount of depression of an accelerator pedal 83, a brake pedal position BP from a brake pedal position sensor 86 that detects an amount of depression of a brake pedal 85, and a vehicle speed V from a vehicle speed sensor 88. Examples thereof include a mode signal from a mode switch 89 that instructs switching between a normal mode in which priority is given to fuel efficiency or stillness and a power mode (an output priority mode) in which greater priority is given to responsiveness (traveling performance) compared with that in the normal mode (fuel efficiency or stillness). The "responsiveness" may mean, for example, a performance of changing the vehicle speed quickly according to the acceleration operation amount. A driving control signal to a feed pump or the like is output from the HVECU 70 via the output port. As described above, the HVECU 70 is connected to the engine ECU 24, the motor ECU 40, the battery ECU 52, and the onboard navigation device 60 via the communication port. The HVECU 70 is configured to communicate with the cloud server CS in a wireless manner.

The cloud server CS is configured to communicate with vehicles including the hybrid vehicle 20 in a wireless manner and stores traveling history information of the vehicles. The traveling history information includes a parking position, a parking time, and a parking duration. In the following description, parking in which the parking duration is longer than a predetermined period T1 (for example, 5 hours, 6 hours, or 7 hours) is referred to as "long-term parking/" and parking in which the parking duration is equal to or shorter than the predetermined period T1 is referred to as "short-term parking." A point at which the vehicle parked for a long term in a past trip is referred to as a "long-term parking point," and a point at which the vehicle parked for a short terra in a past trip is referred to as a "short-term parking point." When a certain point corresponds to both the long-term parking point and the short-term parking point, the point may be set to the long-term parking point or the short-term parking point depending on a day of the week or a time line or may be set to the long-term parking point or the short-term parking point depending on an average parking duration or the like. The predetermined period T1 is determined, for example, as a period of time in which the engine 22 or the catalyst 25a is sufficiently cooled, and a fixed period of time may be used or a period of time varying depending on the atmospheric temperature or the like may be used.

The cloud server CS predicts a destination (an arrival point) of the current trip from the long-term parking point or the short-term parking point based on the traveling history information or a start point of the trip (a departure point) for each vehicle. For example, when a departure point is point A (for example, home) before noon of weekdays, the cloud server CS predicts point B (for example, a company) as a destination. When a departure point is not point A afternoon of weekdays or holidays, the cloud server CS predicts point A as a destination. When a departure point is point A afternoon of week days or holidays, the cloud server CS is assumed not to predict a destination (a destination is unclear).

The hybrid vehicle 20 having the above-mentioned configuration travels in a hybrid traveling; mode (HV traveling mode) in which the vehicle travels with the engine 22 operating and in an electric traveling mode (EV traveling mode) in which the vehicle travels with the engine 22 not operating.

Figure 2:
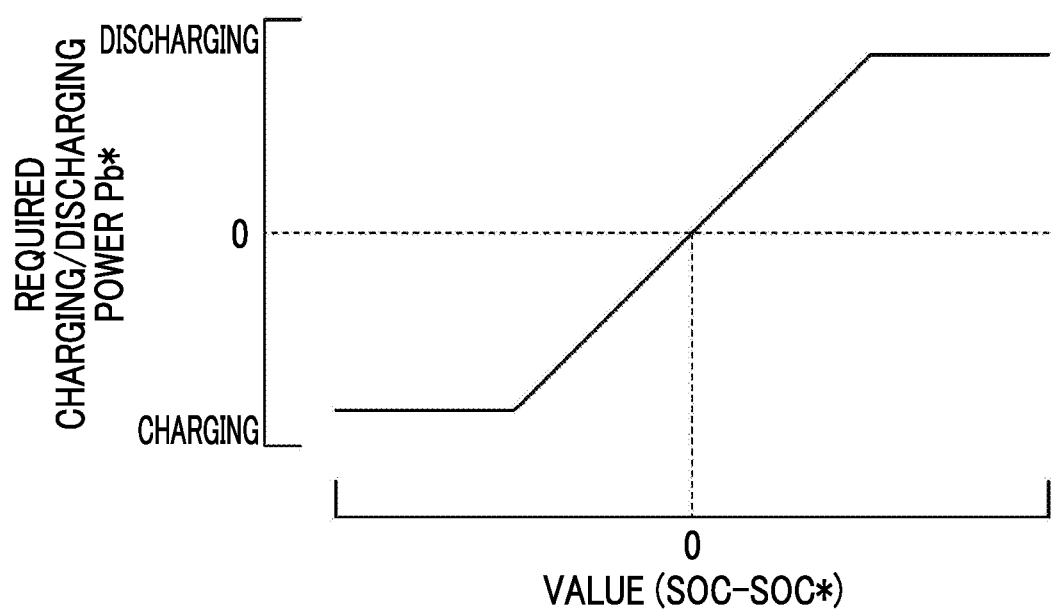
FIG. 2 is a diagram illustrating an example of a required charging/discharging power setting map.

In the HV traveling mode, the HVECU 70 sets a required torque Td* required for the drive shaft 36 based on the accelerator operation amount Acc and the vehicle speed V and calculates a required power Pd* required for the drive shaft 36 by multiplying the set required torque Td* by the rotation speed Nd of the drive shaft 36 (the rotation speed Nm2 of the motor MG2). Subsequently, the HVECU 70 sets a required charging/discharging power Pb* required for the battery 50 (which has a positive value when electric power is discharged from the battery 50) based on a power storage capacity SOC and a target capacity SOC* of the battery 50. The target capacity SOC* of the battery 50 is set by a target capacity setting routine which will be described later. The required charging/discharging power Pb* of the battery 50 is set such that a value (SOC−SOC*) obtained by subtracting the target capacity SOC* from the power storage capacity SOC of the battery 50 is close to zero (approaches zero). FIG. 2 is a diagram illustrating an example of a required charging/discharging power setting map. As illustrated in the drawing, the required charging/discharging power Pb* of the battery 50 is set to zero when the value (SOC−SOC*) is zero, is set to a value of which the absolute value increases within a positive range (within a discharging-side range) as the value (SOC−SOC*) increases when the value (SOC−SOC*) is positive, and is set to a value of which the absolute value increases within a negative range (within a charging-side range) as the value (SOC−SOC*) decreases when the value (SOC−SOC*) is negative.

Then, the HVECU 70 determines whether a warm-up request for the engine 22 or a warm-up request for the catalyst 25a has been issued. Here, the warm-up request for the engine 22 is issued when the coolant temperature Tw of the engine 22 is lower than a predetermined temperature Twref (for example, 70° C., 75° C., or 80° C.), and the warm-up request for the catalyst 25a is issued when the temperature (the catalyst temperature) Tc of the catalyst 25a is lower than a predetermined temperature Tcref (for example, 350° C., 400° C., or 450° C.).

When neither the warm-up request for the engine 22 nor the warm-up request for the catalyst 25a has been issued, the HVECU 70 sets a required power Pe* required for the engine 22 by subtracting the required charging/discharging power Pb* of the battery 50 from the required power Pd*, and sets a target rotation speed Ne* or a target torque Te* of the engine 22 and torque commands Tm1* and Tm2* of the motors MG1 and MG2 such that, the required power Pe* is output from the engine 22 and the required torque Td* is output to the drive shaft 36 within the range of the input and output limits Win and Wout of the battery 50. Subsequently, the HVECU 70 transmits the target rotation speed Ne* or the target torque Te* of the engine 22 to the engine ECU 24 and transmits the torque commands Tm1* and Tm2* of the motors MG1 and MG2 to the motor ECU 40. When the target rotation speed Ne* and the target torque Te* of the engine 22 are received, the engine ECU 24 performs operation control of the engine 22 (intake air control, fuel injection control, ignition control, and the like) such that the engine 22 operates based on the target rotation speed Ne* and the target torque Te*. When the torque command Tm1* and Tm2* of the motors MG1 and MG2 are received, the motor ECU 40 performs switching control of the switching elements of the inverters 41 and 42 such that the motors MG1 and MG2 operate in accordance with the torque commands Tm1* and Tm2*.

When the warm-up request for the engine 22 or the warm-up request for the catalyst 25a has been issued, the HVECU 70 compares the required power Pd* with a sum power (Wout+Pewup) of the output limit Wout of the battery 50 and a power Pewup of the engine 22 for heating the engine 22 or the catalyst 25a. Then, when the required power Pd* is equal to or less than the power (Wout+Pewup), the HVECU 70 sets the power Pewup as the required power Pe*, sets the target rotation speed Ne* or the target torque Te* of the engine 22 and the torque commands Tm1* and Tm2* of the motors MG1 and MG2 such that the required power Pe* is output from the engine 22 and the required torque Td* is output to the drive shaft 36 within the range between the input and output limits Win and Wout of the battery 50, and transmits the set values to the engine ECU 24 or the motor ECU 40. The control of the engine 22 by the engine ECU 24 or the control of the inverters 41 and 42 by the motor ECU 40 are the same as described above. In this case, by delaying an ignition time of the engine 22 compared with a case in which neither the warm-up request for the engine 22 nor the warm-up request for the catalyst 25a has been issued, it is possible to achieve promotion of warm-up of the engine 22 or the catalyst 25a.

When the warm-up request for the engine 22 or the warm-up request for the catalyst 25a has been issued and the required power Pd* is greater than the power (Wout+Pewup), the HVECU 70 sets the required power Pd* as the required power Pe*, sets the target rotation speed Ne* or the target torque Te* of the engine 22 and the torque commands Tm1* and Tm2* of the motors MG1 and MG2 such that the required power Pe* is output from the engine 22 and the required torque Td* is output to the drive shaft 36 within the range between the input and output limits Win and Wout of the battery 50, and transmits the set values to the engine ECU 24 or the motor ECU 40. The control of the engine 22 by the engine ECU 24 or the control of the inverters 41 and 42 by the motor ECU 40 are the same as described above. The ignition time of the engine 22 may be set to be later or to the same when compared with an ignition time in a case where neither the warm-up request for the engine 22 nor the warm-up request for the catalyst 25a has been issued. In this case, by outputting the required power Pd* from the engine 22, a request from a driver can be coped with, but there is a likelihood that emission will deteriorate.

In the HV traveling mode, when all of a condition that the required power Pe* is less than a stopping threshold value Pstop, a condition that neither the warm-up request for the engine 22 nor the warm-up request for the catalyst 25a has been issued, and a condition that a heating request for a passenger compartment with the engine 22 as a heat source has not been issued have been satisfied, the HVECU 70 determines that a stopping condition of the engine 22 has been satisfied, and stops operation of the engine 22 to transition to the EV traveling mode. Accordingly when the required power Pe* is equal to or greater than the stopping threshold value Pstop, when the warm-up request for the engine 22 has been issued, when the warm-up request for the catalyst 25a has been issued, and when the heating request for the passenger compartment has been issued, it can be considered that a stopping prohibiting condition of the engine 22 has been satisfied. The "stopping prohibiting condition for the engine 22" may be considered to be a condition that the engine 22 is predicted to operate continuously over a predetermined period of time (for example, several seconds to several minutes).

In the EV traveling mode, the HVECU 70 sets the required torque Td* required for the drive shaft 36 based on the accelerator operation amount Acc and the vehicle speed V, sets the torque command Tm1* for the motor MG1 to zero, sets the torque command Tm2* for the motor MG2 such that the required torque Td* is output to the drive shaft 36 within the range between the input and output limits Win and Wout of the battery 50, and transmits the torque commands Tm1* and Tm2* for the motors MG1 and MG2 to the motor ECU 40. The control of the inverters 41 and 42 by the motor ECU 40 is the same as described above.

In the EV traveling mode, when at least one of a condition that the required power Pe* which is calculated in the same way as in the HV traveling mode is equal to or greater than a starting threshold value Pstart, a condition that the warm-up request for the engine 22 or the warm-up request for the catalyst 25a has been issued, and a condition that the heating request for the passenger compartment has been issued has been satisfied, the HVECU 70 determines that a starting condition for the engine 22 has been satisfied, and starts the engine 22 to transition to the HV traveling mode. In order to restrain starting and stopping of the engine 22 from being frequently performed for a short time, it is useful that a value which is greater by a margin (for example, several kW) than the stopping threshold value Pstop be used as the starting threshold value Pstart.

Figure 3:
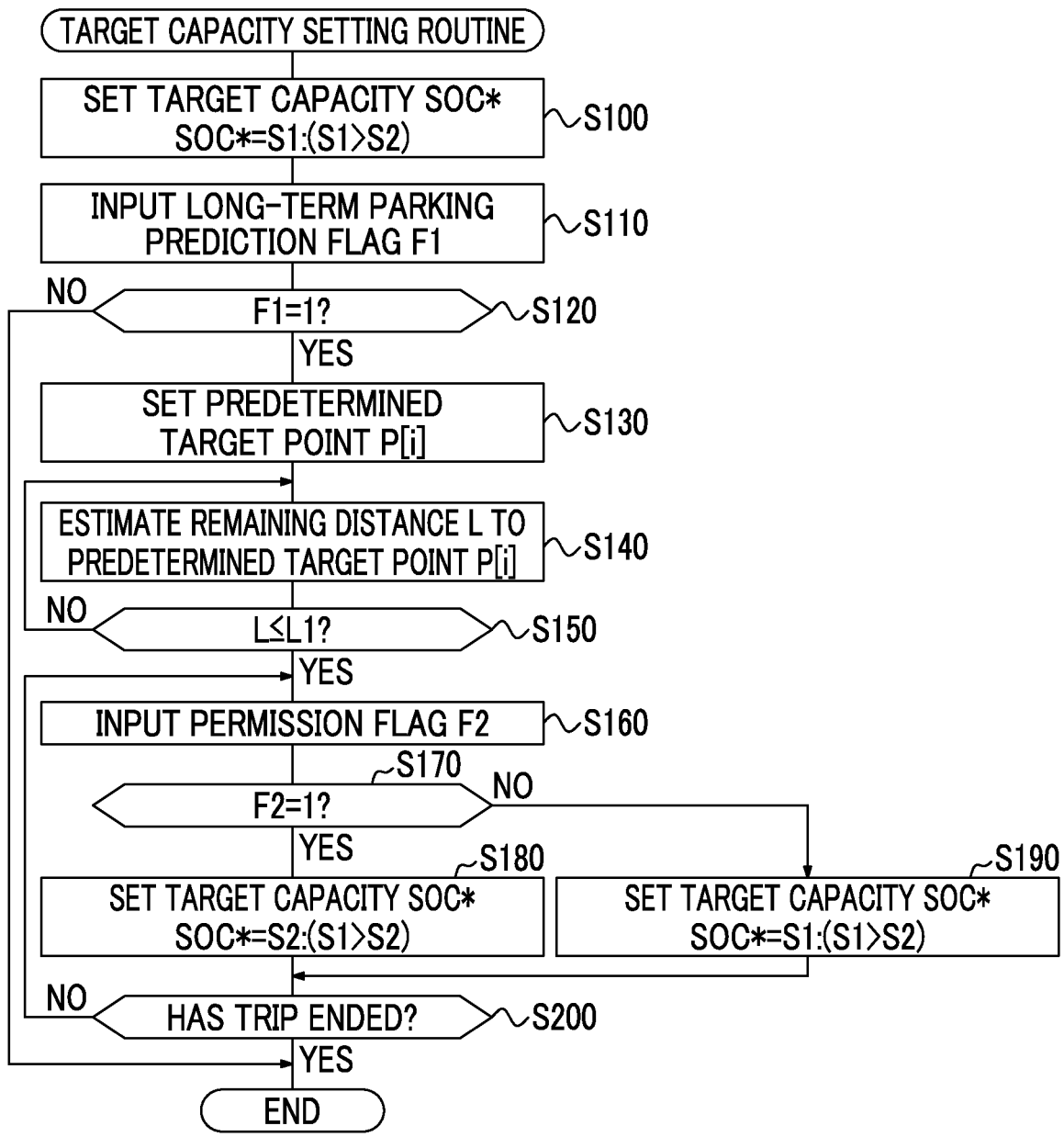
FIG. 3 is a flowchart illustrating an example of a target capacity setting routine which is performed by an HVECU 70.

Operations of the hybrid vehicle 20 according to the embodiment having the above-mentioned configuration, particularly, processes for setting the target capacity SOC* of the battery 50, will be described below. FIG. 3 is a flowchart illustrating an example of a target capacity setting routine which is performed by the HVECU 70. This routine is performed when a trip starts (when the ignition switch 80 is turned on).

When the target capacity setting routine illustrated in FIG. 3 is performed, the HVECU 70 sets the target capacity SOC* of the battery 50 to a predetermined value S1 (Step S100). For example, 58%, 60%, or 62% is used as the predetermined value S1.

Subsequently, the HVECU 70 sets a long-term parking prediction flag F1 (Step S110) and checks the set value of the long-term parking prediction flag F1 (Step S120). Here, the long-term parking prediction flag F1 is set to 1 when long-term parking at a predetermined point is predicted, and is set to 0 when long-term parking at the predetermined point is not predicted. The "predetermined point" is a point at which there is a likelihood of long-term parking, and examples thereof include the home, a company, a shopping mall, a leisure facility, and a lodging facility. The "predetermined point" includes a point which is set (registered) in advance before shipment of the vehicle, a point which is set (registered) by causing a user to operate the display 66, and a long-term parking point which is input from the cloud server CS by wireless communication.

Determination of whether long-term parking at a predetermined point is predicted can be performed as follows. When a destination has been set by a user, it can be performed by determining whether the set destination is included in the predetermined point or whether a scheduled arrival time at the set destination is included in the day or the time line in which the long-term parking is predicted. On the other hand, when a destination has not been set by a user, it can be determined by determining whether a destination has been predicted by the cloud server CS, whether the predicted destination is included in the predetermined point, or whether a scheduled arrival time at the predicted destination is included in the day or the time line in which the long-term parking is predicted. Since a certain period of time is required from a time point at which a trip starts to a time point at which a destination is set by a user, the process of Step S110 may be performed when a destination has been set by a user, when a certain period of time has elapsed, or when the vehicle has traveled a certain distance after the process of Step S100 has been performed.

When it is checked in Step S120 that the value of the long-term parking prediction flag F1 is 0, the HVECU 70 determines that long-term parking at the predetermined point is not predicted, and ends this routine. In this case, the target capacity SOC* of the battery 50 is maintained at the predetermined value S1 until the current trip ends.

When it is checked in Step S120 that the value of the long-term parking prediction flag F1 is 1, the HVECU 70 determines that long-term parking at the predetermined point is predicted, and sets the destination set by the user or the destination predicted by the cloud server CS as a predetermined target point P[i] (Step S130). Here, [i] is a number corresponding to the home, a company, a shopping mall, a leisure facility, a lodging facility, or the like.

Subsequently, the HVECU 70 estimates a remaining distance L to the predetermined target point P[i] based on the current location, the destination, and the map information (Step S140), compares the estimated remaining distance L with a predetermined distance L1 (for example, 3 km, 4 km, or 5 km) (Step S150), and returns to Step S140 when the remaining distance L is longer than the predetermined distance L1. The HVECU 70 repeatedly performs the processes of Steps S140 and S150 in this way, and waits until the remaining distance L to the predetermined target point P[i] becomes equal to or less than the predetermined distance L1.

When it is determined in Step S150 that the remaining distance L to the predetermined target point P[i] becomes equal to or less than the predetermined distance L1, the HVECU 70 sets a value of a permission flag F2 (Step S160), and checks the set value of the permission flag F2 (Step S170). Here, the permission flag F2 is set to 1 when execution of power storage capacity decreasing control which will be described later is permitted, and is set to 0 when the execution is not permitted (is prohibited). The permission flag F2 is set by a permission flag setting routine which will be described later.

When it is checked in Step S170 that the value of the permission flag F2 is 1, the HVECU 70 determines that execution of the power storage capacity decreasing control is permitted, and sets the target capacity SOC* of the battery 50 to a predetermined value S2 less than the predetermined value S1 (Step S180). For example, 48%, 50%, or 52% may be used as the predetermined value S2. In this case, power storage capacity decreasing control of decreasing the power storage capacity SOC of the battery 50 is executed. Specifically, the "power storage capacity decreasing control" is control of controlling the engine 22 or the motors MG1 and MG2 such that the power storage capacity SOC of the battery 50 becomes close to the predetermined value S2.

Then, the HVECU 70 determines whether the current trip has ended (Step S200), returns to Step S160 when it is determined that the current trip has not ended, and ends this routine when it is determined that the current trip has ended. Accordingly, when the value of the permission flag F2 is maintained at 1 after the remaining distance L to the predetermined target point P[i] has reached the predetermined distance L1, the HVECU 70 repeatedly performs the processes of Steps S160 to S180 and S200, and ends this routine when it is determined in Step S200 that the current trip has ended.

In this case, the HVECU 70 executes power storage capacity recovering control of recovering the power storage capacity SOC of the battery 50 in the next trip by executing the power storage capacity decreasing control in the current trip and setting the target capacity SOC* of the battery 50 to the predetermined value S1 when the next trip starts. Here, "power storage capacity recovering control" is specifically control of controlling the engine 22 or the motors MG1 and MG2 such that the power storage capacity SOC of the battery 50 becomes close to the predetermined value S1 (in the next trip) after executing the power storage capacity decreasing control.

Figure 4:
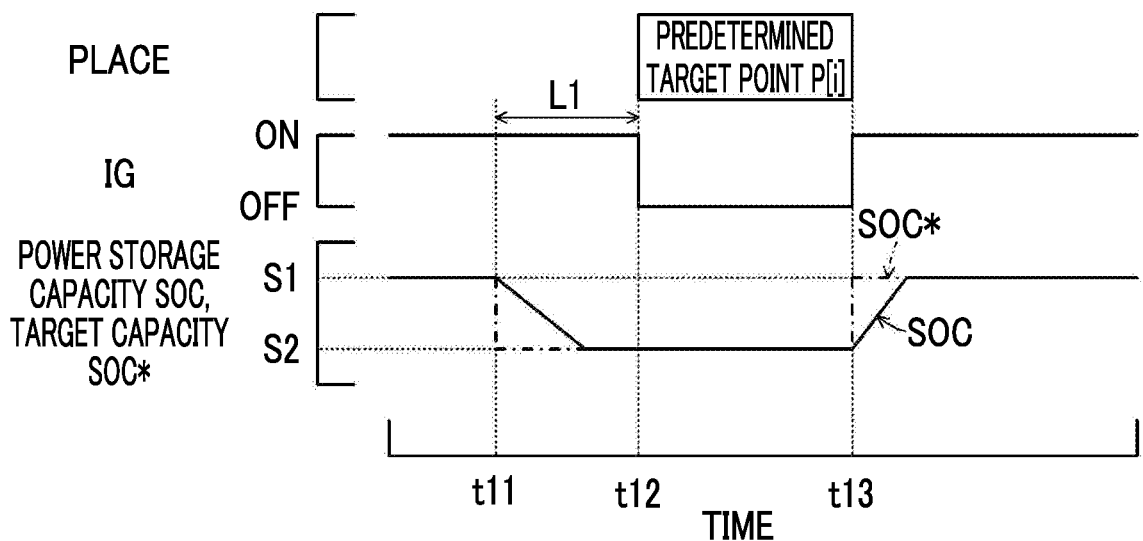
FIG. 4 is a diagram illustrating an example of a state in which power storage capacity decreasing control and power storage capacity recovering control are executed.

FIG. 4 is a diagram illustrating an example in which power storage capacity decreasing control and power storage capacity recovering control are executed. When the remaining distance L to the predetermined target point P[i] in the current trip becomes equal to or less than the predetermined distance L1 (time t11), the power storage capacity SOC of the battery 50 at the time of ending of the current trip (time t12) or at the time of starting of the next trip (time t13) can be set to be lower (to get close to the predetermined value S2) by executing the power storage capacity decreasing control (changing the target capacity SOC* of the battery 50 from the predetermined value S1 to the predetermined value S2). Then, by executing the power storage capacity recovering, control (setting the target capacity SOC* of the battery 50 to the predetermined value S3) in the next trip (from time t13), the power storage capacity SOC of the battery 50 can be recovered (to get close to the predetermined value S1), in comparison with a case in which the power storage capacity decreasing control is not executed in the current trip and thus the power storage capacity SOC of the battery 50 at the time of starting of the next trip is high (close to the predetermined value S1), the required charging/discharging power Pb* of the battery 50 can be decreased (a charging-side value can be increased) to increase the required power Pe*, that is, the output of the engine 22, through this sequence of control, when the engine 22 operates in response to the heating request for the passenger compartment in the next trip. Accordingly, it is possible to charge the battery 50 while operating the engine 22 at an efficient operating point and securing a sufficient amount of heat for heating. As a result, it is possible to achieve an improvement in energy efficiency.

When it is checked in Step S170 of the target capacity setting routine illustrated in FIG. 3 that the value of the permission flag F2 is 0, the HVECU 70 sets the target capacity SOC* of the battery 50 to the predetermined value S1 (Step S190) and then transitions to Step S200. Accordingly, when the value of the permission flag F2 is 0 immediately after the remaining distance L to the predetermined target point P[i] becomes equal to or less than the predetermined distance L1 in Step S150 or when the value of the permission flag F2 is changed from 1 to 0 during execution of the power storage capacity decreasing control, execution of the power storage capacity decreasing control is prohibited (a state in which the power storage capacity decreasing control is not executed is maintained and the execution ends when the power storage capacity decreasing control is executed).

When the power storage capacity decreasing control is not executed (the processes of Steps S160, S170, S190, and S200 are repeatedly performed) and the value of the permission flag F2 is changed from 0 to 1, the power storage capacity decreasing control is executed (execution thereof is started). Accordingly, if is possible to decrease the power storage capacity SOC of the battery 50 and to execute the power storage capacity recovering control in the next trip.

Figure 5:
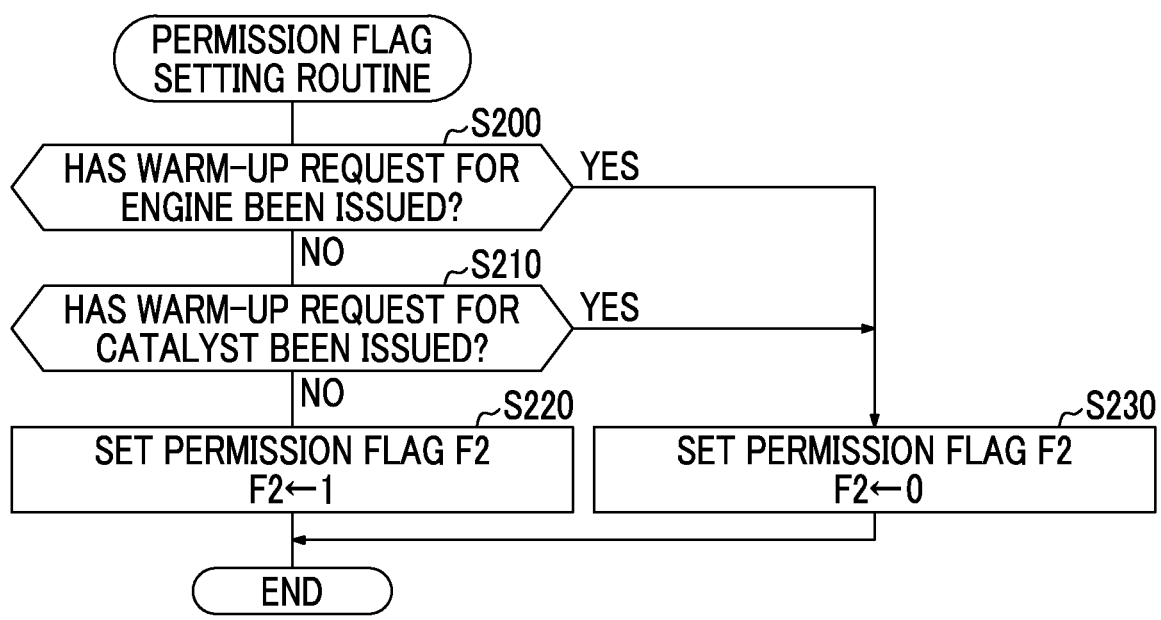
FIG. 5 is a flowchart illustrating an example of a permission flag setting routine which is performed by the HVECU 70.

Processes for setting the permission flag F2 will be described below. FIG. 5 is a flowchart illustrating an example of a permission flag setting routine which is performed by the HVECU 70. This routine is repeatedly performed when the value of the long-term parking prediction flag F1 is 1 (when long-term parking at the predetermined point is predicted).

When the permission flag setting routine illustrated in FIG. 5 is performed, the HVECU 70 determines whether a warm-up request for the engine 22 or a warm-up request for the catalyst 25a has been issued (Steps S200 and S210). This determination is performed using the coolant temperature Tw of the engine 22 or the temperature Tc of the catalyst 25a as described above.

When it is determined in Steps S200 and S210 that neither the warm-up request for the engine 22 nor the warm-up request for the catalyst 25a has been issued, the HVECU 70 determines that execution of the power storage capacity decreasing control is permitted, sets the value of permission flag F2 to 1 (Step S220), and ends this routine. On the other hand, when it is determined that the warm-up request for the engine 22 or the warm-up request for the catalyst 25a has been issued, the HVECU 70 determines that execution of the power storage capacity decreasing control is not permitted (is prohibited), sets the value of the permission flag F2 to 0 (Step S230), and ends this routine.

When the power storage capacity decreasing control is executed, the power storage capacity SOC of the battery 50 decreases and thus the output limit Wout of the battery 50 decreases. Accordingly, when the warm-up request for the engine 22 or the warm-up request for the catalyst 25a has been issued, the required power Pd* is likely to be greater than the power (Wout+Pewup) and there is a likelihood that emissions will deteriorate. On the other hand, in the embodiment, when the warm-up request for the engine 22 or the warm-up request for the catalyst 25a has been issued, it is possible to restrain the power storage capacity SOC of the battery 50 from decreasing to decrease the output limit Wout and to restrain the required power Pd* from becoming greater than the power (Wout+Pewup), by prohibiting execution of the power storage capacity decreasing control. As a result, it is possible to curb deterioration in emissions.

In the embodiment, when neither the warm-up request for the engine 22 nor the warm-up request for the catalyst 25a has been issued, the HVECU 70 determines that execution of the power storage capacity decreasing control is permitted and sets the value of the permission flag F2 to 1. Accordingly, when the stopping prohibiting condition for the engine 22 is satisfied because the required power Pe* is equal to or greater than the stopping threshold value Pstop or the heating request for the passenger compartment has been issued, execution of the power storage capacity decreasing control is not limited.

In the hybrid vehicle 20 according to the embodiment, when long-term parking at the predetermined target point P[i] is predicted and the warm-up request for the engine 22 or the warm-up request for the catalyst 25a has been issued, execution of the power storage capacity decreasing control is prohibited. Accordingly it is possible to restrain the power storage capacity SOC of the battery 50 from decreasing to decrease the output limit Wont and to restrain the required power Pd* from becoming greater than the power (Wout+ Pewup). As a result, it is possible to curb deterioration in emissions.

In the hybrid vehicle 20 according to the embodiment, when the coolant temperature Tw of the engine 22 is lower than the predetermined temperature Twref, the warm-up request for the engine 22 is issued, the stopping prohibiting condition for the engine 22 is satisfied, and execution of the power storage capacity decreasing control is prohibited. That is, the threshold value for determining whether the warm-up request for the engine 22 has been issued and the threshold value for determining whether execution of the power storage capacity decreasing control is permitted are set to the same value. However, the threshold value for determining whether the warm-up request for the engine 22 has been issued and the threshold value for determining whether execution of the power storage capacity decreasing control is permitted may be set to different values.

In the hybrid vehicle 20 according to the embodiment, when the temperature Tc of the catalyst 25a is lower than the predetermined temperature Tcref, the warm-up request for the catalyst 25a is issued, the stopping prohibiting condition for the engine 22 is satisfied, and execution of the power storage capacity decreasing control is prohibited. That is, the threshold value for determining whether the warm-up request for the catalyst 25a has been issued and the threshold value for determining whether execution of the power storage capacity decreasing control is permitted are set to the same value. However, the threshold value for determining whether the warm-up request for the catalyst 25a has been issued and the threshold value for determining whether execution of the power storage capacity decreasing control is permitted may be set to different values.

Figure 6:
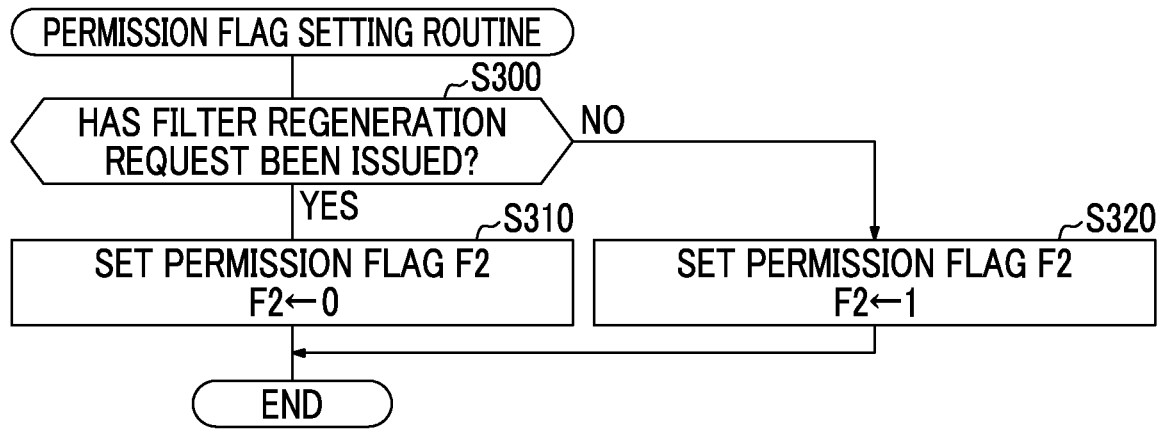
FIG. 6 is a flowchart illustrating an example of a permission flag setting routine according to a modified example.
Figure 7:
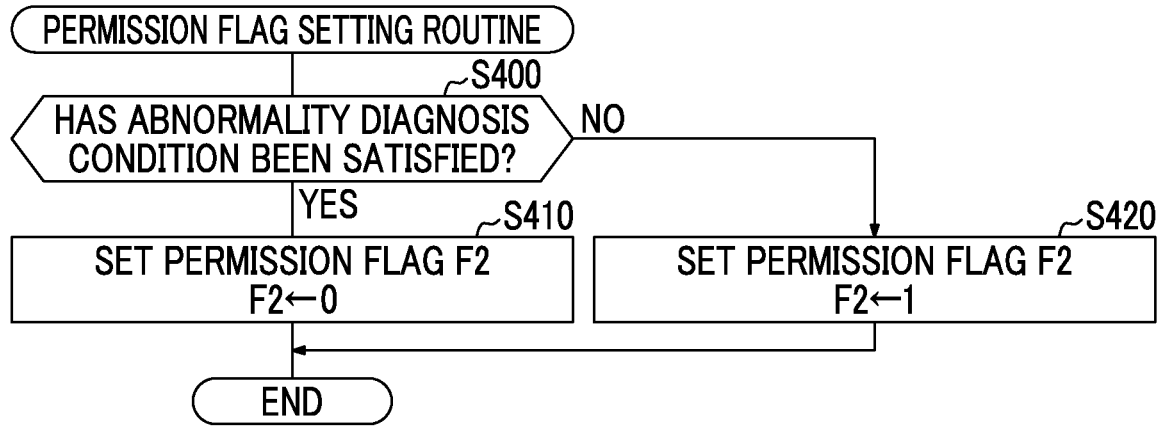
FIG. 7 is a flowchart illustrating an example of a permission flag setting routine according to a modified example.
Figure 8:
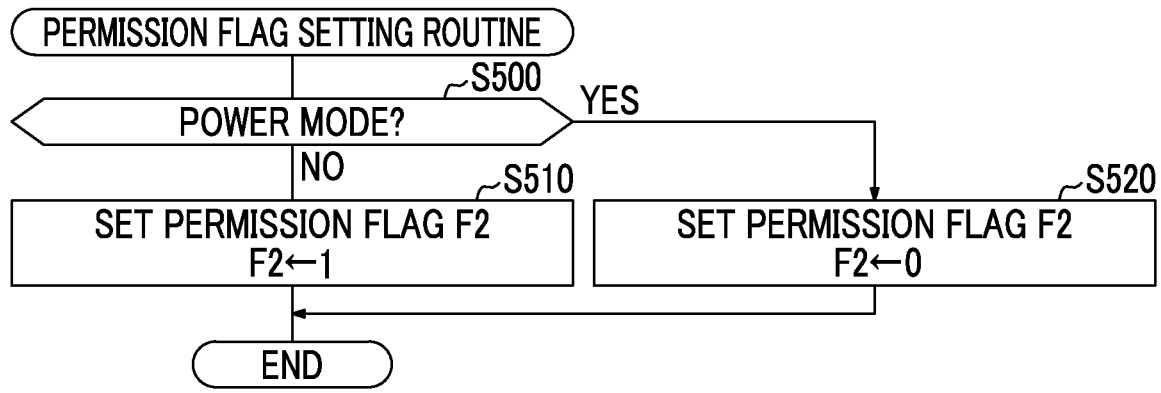
FIG. 8 is a flowchart illustrating an example of a permission flag setting routine according to a modified example.

In the hybrid vehicle 20 according to the embodiment, the HVECU 70 performs the permission flag setting routine illustrated in FIG. 5, hut may perform permission flag setting routines illustrated in FIGS. 6 to 8 instead thereof. These permission flag setting routines will be sequentially described below.

The permission flag setting routine illustrated in FIG. 6 will be described now. Although not described in the embodiment, when the PM deposition amount Qpm is equal to or greater than a threshold value Qref at which the PM filter 25f needs to be regenerated, the HVECU 70 determines that a regeneration request for the PM filter 25f has been issued, and performs the following control by cooperative control of the HVECU 70 and the engine ECU 24. Operation stopping of the engine 22 is prohibited and dither control of operating the engine 22 while performing injection of fuel such that a rich state (a state in which an amount of fuel is greater than a stoichiometric air-fuel ratio) and a lean state (a state in which an amount of fuel is less than the stoichiometric air-fuel ratio) of an air-fuel ratio of the engine 22 are repeated. Accordingly, an increase of the temperature tf of the PM filter 25f is accelerated. When the temperature tf of the PM filter 25f becomes equal to or greater than a regenerate temperature (for example, 550° C., 600° C., or 650° C.), the air (oxygen) is supplied to the PM filter 25f by setting the air-fuel ratio to the lean state or performing fuel cut and particulate matter deposited on the PM filter 25f is combusted, thereby regenerating the PM filter 25f. Accordingly, when the regeneration request for the PM filter 25f has been issued, it can be considered that the stopping prohibiting condition for the engine 22 is satisfied.

When the permission flag setting routine illustrated in FIG. 6 is performed, the HVECU 70 determines whether the regeneration request for the PM filter 25f has been issued (Step S300). When it is determined that the regeneration request for the PM filter 25f has not been issued, the HVECU 70 determines that execution of the power storage capacity decreasing control is permitted, sets the value of the permission flag F2 to 1 (Step S320), and ends this routine. On the other hand, when it is determined that the regeneration request for the PM filter 25f has been issued, the HVECU 70 determines that execution of the power storage capacity decreasing control is not permitted (is prohibited), sets the value of the permission flag F2 to 0 (Step S310), and ends this routine.

When the power storage capacity decreasing control is executed, the power storage capacity SOC of the battery 50 decreases and thus the engine 22 is likely to reach a light-load state. Accordingly, there is a likelihood that a time until the temperature if of the PM filter 25f becomes equal to or higher than the regenerate temperature will increase and a time required until regeneration of the PM liter 25f is completed will increase. On the other hand. In this modified example, when the regeneration, request for the PM filter 25f has been issued. It is possible to restrain the engine 22 from entering a light-load state, to restrain the time required until the temperature tf of the PM filter 25f becomes equal to or higher than the regenerable temperature from increasing, and to restrain the time required until regeneration of the PM filter 25f is completed from increasing, by prohibiting execution of the power storage capacity decreasing control.

The permission flag setting routine illustrated in FIG. 7 will be described now. Although not described in the embodiment, when an abnormality diagnosis executing condition including a condition that an operating, point (the rotation speed Ne and the torque Te) of the engine 22 is within a predetermined range has been satisfied, stopping of operation of the engine 22 is prohibited, and abnormality diagnosis of the air-fuel ratio sensor 25b, abnormality diagnosis of the oxygen sensor 25c, and imbalance diagnosis of whether an imbalance in an amount of fuel injected has occurred between cylinders of the engine 22 are performed. Accordingly, it can be considered that the stopping prohibiting condition for the engine 22 has been satisfied when the abnormality diagnosis executing condition has been satisfied.

When the permission flag setting routine illustrated in FIG. 7 is performed, the HVECU 70 determines whether the abnormality diagnosis executing condition for the engine 22 has been satisfied (Step S400). When if is determined that the abnormality diagnosis executing condition for the engine 22 has not been satisfied, the HVECU 70 determines that execution of the power storage capacity decreasing control is permitted, sets the value of the permission flag F2 to 1 (Step S420), and ends this routine. On the other hand, when it is determined that the abnormality diagnosis executing condition for the engine 22 has been satisfied, the HVECU 70 determines that execution of the power storage capacity decreasing control is not permitted (is prohibited), sets the value of the permission flag F2 to 0 (Step S410), and ends this routine.

When the power storage capacity decreasing control is executed, the power storage capacity SOC of the battery 50 decreases and thus the operating point of the engine 22 may vary even when the required power Pd* is substantially constant. Accordingly, the abnormality diagnosis of the engine 22 cannot be appropriately performed aid there is a likelihood that the time required for the abnormality diagnosis will increase. On the other hand, in this modified example, when the abnormality diagnosis executing condition for the engine 22 has been satisfied, it is possible to restrain the operating point of the engine 22 from varying, to appropriately perform the abnormality diagnosis of the engine 22, and to restrain the time required for the abnormality diagnosis from increasing, by prohibiting execution of the power storage capacity decreasing control.

The permission flag setting routine illustrated in FIG. 8 will be described now. Although not described in the embodiment, when the power mode is set, operation stopping of the engine 22 is prohibited and the required torque Td* is set to be greater with respect to the same accelerator operation amount Acc and the same vehicle speed V in comparison with a case in which the normal mode is set, by operating the mode switch 89.

When the permission flag setting routine illustrated in FIG. 8 is performed, the HVECU 70 determines whether the normal mode is set or the power mode is set (Step S500). When it is determined that the normal mode is set, the HVECU 70 determines that execution of the power storage capacity decreasing control is permitted, sets the value of the permission flag F2 to 1 (Step S510), and ends this routine. On the other hand, when it is determined that the power mode is set, the HVECU 70 determines that execution of the power storage capacity decreasing control is not permitted (is prohibited), sets the value of the permission flag F2 to 0 (Step S520), and ends this routine.

When the power storage capacity decreasing control is executed, the power storage capacity SOC of the battery 50 decreases, and thus the output limit Wont of the battery 50 is likely to decrease, and an upper-limit power which can be discharged from the motor MG2 is likely to decrease. It is considered that a user is likely to strongly depress the accelerator pedal 83 when the power mode is set, but there is a likelihood that responsiveness (traveling performance) will decrease when the upper-limit power of the motor MG2 decreases. On the other hand, in this modified example, by prohibiting execution of the power storage capacity decreasing control when the power mode is set, it is possible to restrain the power storage capacity SOC of the battery 50 from decreasing to decrease the output limit Wout and to restrain the Upper-limit power of the motor MG2 from decreasing. As a result, it is possible to improve responsiveness (traveling performance).

In the hybrid vehicle 20 according to the embodiment, in the permission, flag setting routine illustrated in FIG. 5, execution of the power storage capacity decreasing control is prohibited when the warm-up request tor the engine 22 or the warm-up request for the catalyst 25a has been issued. In this modified example, execution of the power storage capacity decreasing control is prohibited when the regeneration request for the PM filter 25f has been issued in the permission flag setting routine illustrated in FIG. 6, execution of the power storage capacity decreasing control is prohibited when the abnormality diagnosis executing condition for the engine 22 has been satisfied in the permission flag setting routine illustrated in FIG. 7, or execution of the power storage capacity decreasing control is prohibited when the power mode is set in the permission flag setting routine illustrated in FIG. 8. However, when these conditions are combined and in at least one of the condition that the warm-up request for the engine 22 has been issued, the condition that the warm-up request for the catalyst 25a has been issued, the condition that the regeneration request for the PM filter 25f has been issued, the condition that the abnormality diagnosis executing condition for the engine 22 has been satisfied, and the condition that the power mode is set has been satisfied, execution of the power storage capacity decreasing control may be prohibited.

In the hybrid vehicle 20 according to the embodiment or the modified example, when at least one of the condition that the warm-up request for the engine 22 has been issued, the condition that the warm-up request for the catalyst 25a has been issued, the condition that the regeneration request for the PM filter 25f has been issued, the condition that the abnormality diagnosis executing condition for the engine 22 has been satisfied, and the condition that the power mode is set has been satisfied and thus the stopping prohibiting condition for the engine 22 has been satisfied, execution of the power storage capacity decreasing control is prohibited. However, satisfaction of the stopping prohibiting condition for the engine 22 and prohibition of execution of the power storage capacity decreasing control do not have to occur at the same time, and a delay time with respect to the satisfaction, of the stopping prohibiting condition for the engine 22 may be provided in starting of the prohibition of execution of the power storage capacity decreasing control. Accordingly when the satisfaction of the stopping prohibiting condition for the engine 22 ends for a short time, it is possible to appropriately execute the power storage capacity decreasing control.

In the hybrid vehicle 20 according to the embodiment, when the required power Pe* is equal to or greater than the stopping threshold value Pstop and thus the stopping prohibiting condition for the engine 22 has been satisfied, execution of the power storage capacity recovering control is permitted. However, the parameter associated with the traveling output of the vehicle is not limited to the required power Pe*, and the same can be true, when the accelerator operation amount Acc or the vehicle speed V, the required torque Td* for the drive shaft 36, the required power Pd* for the drive shaft 36, the actual torque Td of the drive shaft 36, the actual power Pd of the drive shaft 36, and the actual power Pe of the engine 22 are equal to or greater than corresponding threshold values and thus the stopping prohibiting condition for the engine 22 has been satisfied.

In the hybrid vehicle 20 according to the embodiment, when the required power Pe* is equal to or greater than the stopping threshold value Pstop and thus the stopping prohibiting condition for the engine 22 has been satisfied, execution of the power storage capacity decreasing control is permitted, but execution of the power storage capacity decreasing control may be prohibited. In this case, the threshold value for determining whether execution of the power storage capacity decreasing control is permitted may be set to a value greater than the stopping threshold value Pstop. A delay time with respect to starting of the prohibition of execution of power storage capacity decreasing control may be provided in starting of satisfaction of the stopping prohibiting condition for the engine 22. In this case, when satisfaction of the stopping prohibiting condition for the engine 22 ends for a short time, it is possible to appropriately execute power storage capacity decreasing control.

In the hybrid vehicle 20 according to the embodiment, when a heating request for the passenger compartment has been issued and thus the stopping prohibiting condition for the engine 22 has been satisfied, execution of the power storage capacity decreasing control is permitted, but execution of the power storage capacity decreasing control may be prohibited. In this case, a delay time with respect to starting of the prohibition of execution of power storage capacity decreasing control may be provided in starting of satisfaction of the stopping prohibiting condition for the engine 22. In this case, when satisfaction of the stopping prohibiting condition for the engine 22 ends for a short time, it is possible to appropriately execute power storage capacity decreasing control.

Figure 9:
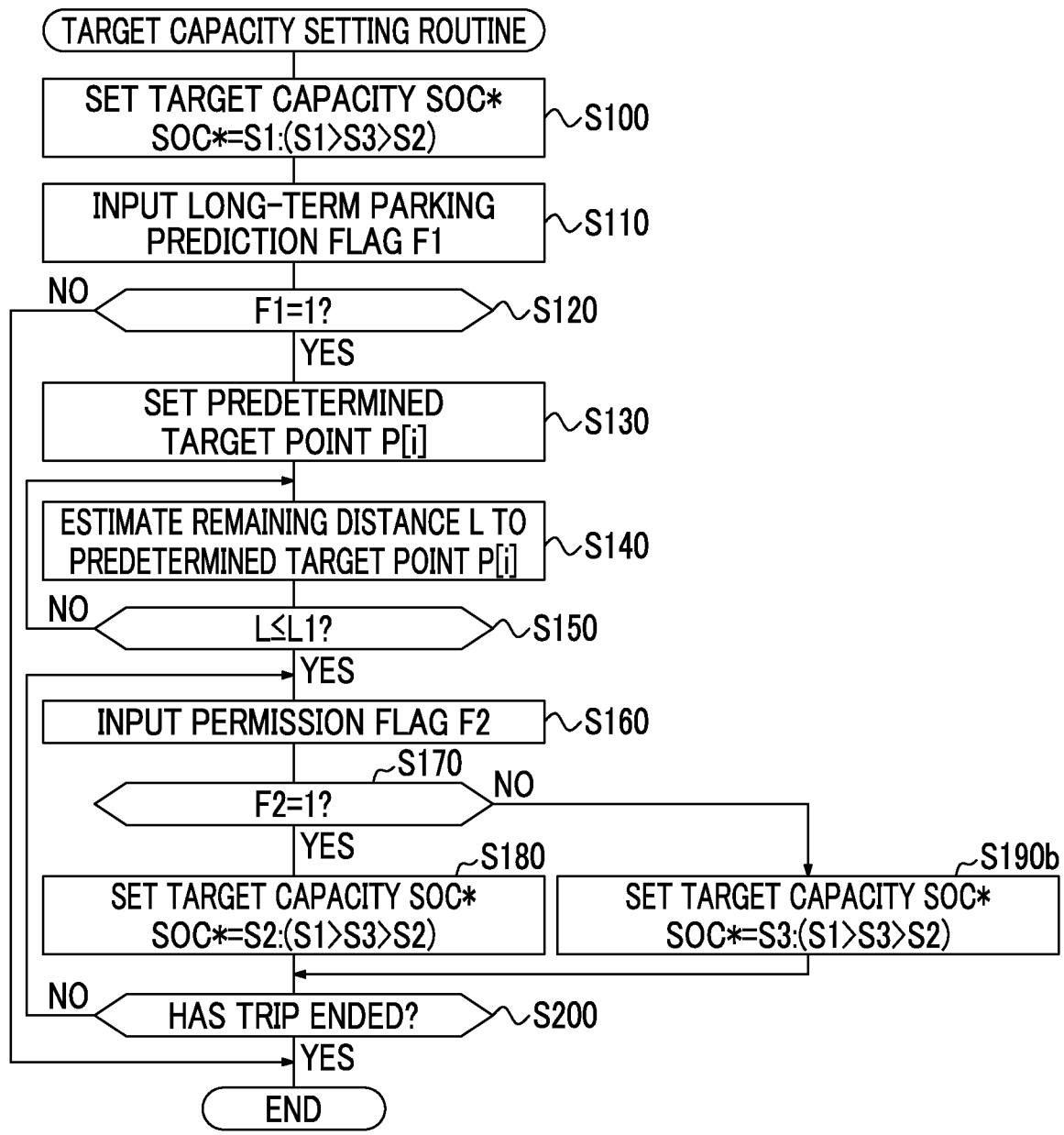
FIG. 9 is a flowchart illustrating an example of a target capacity setting routine according to a modified example.

In the hybrid vehicle 20 according to the embodiment, the HVECU 70 performs the target capacity setting routine illustrated in FIG. 3, but may perform a target capacity setting routine illustrated in FIG. 9 instead thereof. The target capacity setting routine illustrated in FIG. 9 is the same as the target capacity setting routine illustrated in FIG. 3, except that the process of Step S190b is performed instead of the process of Step S190. Accordingly, the same processes will be referred to by the same step numbers and detailed description will be omitted.

In the target capacity setting routine illustrated in FIG. 9, when it is determined in Step S170 that the value of the permission flag F2 is 0, the HVECU 70 sets the target capacity SOC* of the battery 50 to a predetermined value S3 which is less than the predetermined, value S1 and greater than the predetermined value S2 (Step S190b) and transitions to Step S200. Here, as the predetermined value S3, a substantially median value between the predetermined value S1 and the predetermined value S2, for example, 54%, 55%, or 56%, is used. In this case, second power storage capacity decreasing control of limiting an amount of decreased power storage capacity SOC of the battery 50 compared with that in the power storage capacity decreasing control is executed in the current trip. The "second power storage capacity decreasing control" is specifically control of controlling the engine 22 or the motors MG1 and MG2 such that the power storage capacity SOC of the battery 50 is close to the predetermined value S3. That is, the disclosure is not limited to execution of the power storage capacity decreasing control as in the embodiment, but the second power storage capacity decreasing control may be executed instead of the power storage capacity decreasing control.

In the hybrid vehicle 20 according to the embodiment, as the power storage capacity decreasing control, the target capacity SOC* of the battery 50 is set to the predetermined value S2 which is less than the predetermined value S1 when the power storage capacity decreasing control is not executed. However, the disclosure is not limited to the target capacity SOC* of the battery 50, but a starting capacity SOCst as a starting power storage capacity SOC of the engine 22 for forcibly charging the battery 50 may be set to a value less than that when the power storage capacity decreasing control is not executed.

In the hybrid vehicle 20 according to the embodiment, as the power storage capacity decreasing control, the target capacity SOC* of the battery 50 is set to the predetermined value S2 which is less than the predetermined value S1 when the power storage capacity decreasing control is not executed. However, instead of or in addition to the power storage capacity decreasing control, a stopping threshold value Pstop or a starting threshold value Pstart may be set to a value greater than that when the power storage capacity decreasing control is not executed. As long as they are starting, and stopping threshold values associated with a traveling output for the vehicle, the disclosure is not limited to the stopping threshold value Pstop or the starting threshold value Pstart for the required power Pe*, hut starting: and stopping threshold values for the accelerator operation amount Acc, starting and stopping threshold values for the vehicle speed V, starting and stopping threshold values for the required torque Td*, starting and stopping threshold values for the required power Pd*, starting and stopping threshold values for an actual torque Td of the drive shaft 36, starting and stopping threshold values for an actual power Pd of the drive shaft 36, starting and stopping threshold values for an actual power Pe of the engine 22, and the like may be set to values greater than those when the power storage capacity decreasing control is not executed as the power storage capacity decreasing control.

In the hybrid vehicle 20 according to the embodiment, the onboard navigation device 60 sets a destination, sets a scheduled traveling route from a current location of the vehicle to a destination, or performs route guidance for the scheduled traveling route. However, a mobile terminal (for example, a smartphone or a tablet) that can wirelessly communicate with the HVECU 20 may set a destination, set a scheduled traveling route from a current location of the vehicle to a destination, or perform route guidance for the scheduled traveling route. In this case, in the target capacity setting routine illustrated in FIG. 3, a destination may be input from the mobile terminal instead of inputting a destination from the onboard navigation device 60.

The hybrid vehicle 20 according to the embodiment includes the onboard navigation device 60, but may not include the onboard navigation device 60.

The hybrid vehicle 20 according to the embodiment is a vehicle that does not include a connector capable of being connected to an external power supply, that is, a vehicle which cannot be subjected to external charging which is charging of the battery 50 using electric power from the external power supply. However, the hybrid vehicle 20 may be a vehicle which can be subjected to external charging. In some embodiments, a position at which external charging is not available be set (registered) as the predetermined position. This is because there is low necessity for power storage capacity decreasing control before long-term parking, when the vehicle is subjected to external charging during long-term parking at the predetermined point.

In the hybrid vehicle 20 according to the embodiment, the battery 50 is used as a power storage device, but a capacitor may be used instead of the battery 50.

The hybrid vehicle 20 according to the embodiment includes the engine ECU 24, the motor ECU 40, the battery ECU 52, and the HVECU 70, but at least two thereof may be configured as a single electronic control unit.

Figure 10:
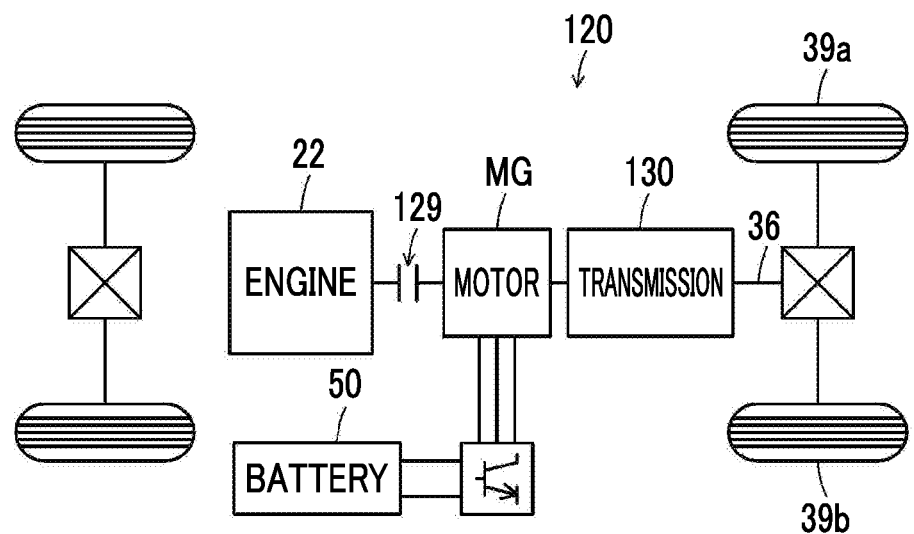
FIG. 10 is a diagram schematically illustrating a configuration of a hybrid vehicle 120 according to a modified example.
Figure 11:
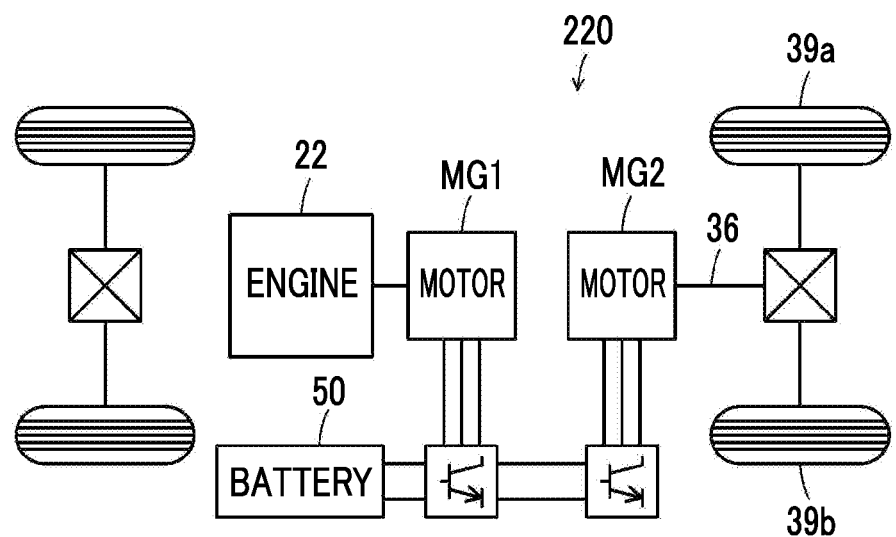
FIG. 11 is a diagram schematically illustrating a configuration of a hybrid vehicle 220 according to a modified example.

In the hybrid vehicle 20 according to the embodiment, a configuration in which the engine 22 and the motor MG1 are connected to the drive shaft 36 connected to the driving wheels 39a and 39b via the planetary gear 30, motor MG2 is connected to the drive shaft 36 and the battery 50 is connected to the motors MG1 and MG2 via a power line has been employed. However, as can be seen from a hybrid vehicle 120 according to a modified example illustrated in FIG. 10, a configuration of a so-called single-motor hybrid vehicle in which a-motor MG is connected to the drive shaft 36 connected to the driving wheels 39a and 39b via a transmission 130, the is connected to the motor MG via a clutch 129, and the battery 50 is connected to the motor MG via a power line may be employed. As can be seen from a hybrid vehicle 220 according to a modified example illustrated in FIG. 11, a configuration of a so-called series hybrid vehicle in which a power-generating motor MG1 is connected to the engine 22, a traveling motor MG2 is connected to the drive shaft 36 connected to the driving wheels 39*a* and 39*b*, and the battery 50 is connected to the motors MG1 and MG2 via a power line may be employed.

In the embodiment, the disclosure is embodied as the hybrid vehicle 20, but may be embodied as a controller mounted in the hybrid vehicle 20. In this case, the HVECU 70, the engine ECU 24, the motor ECU 40, and the battery ECU 52 correspond to an example of a "controller."

Correspondence between principal elements of the embodiment and principal elements of the disclosure described in the SUMMARY will be described below. In the embodiment, the engine 22 corresponds to an example of an "engine." The motor MG1 or the motor MG2 corresponds to an example of a "motor." The battery 50 corresponds to an example of a "power storage device." The HVECU 70, the engine ECU 24, the motor ECU 40, and the battery ECU 52 correspond to an example of a "controller". Note that the functions achieved by the HVECU 70, the engine ECU 24, the motor ECU 40, and the battery ECU 52 also may be achieved by one electronic control unit.

While an embodiment of the disclosure has been described above, the disclosure is not limited to the embodiment and can be modified in various forms without departing from the gist of the disclosure.

The disclosure is applicable to industries for manufacturing hybrid vehicles and controllers mounted therein.

What is claimed is:

1. A hybrid vehicle comprising:
   an engine;
   a motor;
   a power storage device configured to supply electric power to the motor and to be charged with electric power generated by the motor; and
   a control device configured to:
   i) automatically start and stop the engine;
   ii) execute, in a current trip, a power storage capacity decreasing control of controlling the engine and the motor such that a power storage capacity of the power storage device in a case where the hybrid vehicle is predicted to be parked at a predetermined point is lower than a power storage capacity of the power storage device in a case where the hybrid vehicle is predicted to not be parked at the predetermined point, and execute, in a next trip, a power storage capacity recovering control of controlling the engine and the motor such that the power storage capacity of the power storage device is recovered when the engine operates; and
   iii) limit execution of the power storage capacity decreasing control when the hybrid vehicle is predicted to be parked at the predetermined point is predicted and a stopping prohibiting condition for the engine is satisfied.

2. The hybrid vehicle according to claim 1, wherein the control device is configured to not execute the power storage capacity decreasing control when the hybrid vehicle is predicted to be parked at the predetermined point and the stopping prohibiting condition is satisfied.

3. The hybrid vehicle according to claim 1, wherein the stopping prohibiting condition includes a condition that a warm-up request for the engine or a warm-up request for a catalyst which is attached to an exhaust system of the engine to clean exhaust gas has been issued.

4. The hybrid vehicle according to claim 1, wherein the stopping prohibiting condition includes a condition that a regeneration request for a filter which is attached to an exhaust system of the engine to reduce the amount of particulate matter in exhaust gas has been issued.

5. The hybrid vehicle according to claim 1, wherein the stopping prohibiting condition includes a condition that an abnormality diagnosis executing condition for the engine has been satisfied.

6. The hybrid vehicle according to claim 1, wherein the stopping prohibiting condition includes a condition that an output priority mode in which greater priority is given to responsiveness than to fuel efficiency is instructed.

7. The hybrid vehicle according to claim 1, wherein:
   the stopping prohibiting condition includes a condition that a parameter associated with a traveling output of a vehicle is equal to or greater than a threshold value; and
   the control device is configured to not limit execution of the power storage capacity decreasing control when the hybrid vehicle is predicted to be parked at the predetermined point and the parameter is equal to or greater than the threshold value.

8. The hybrid vehicle according to claim 1, wherein:
   the stopping prohibiting condition includes a condition that a heating request for a passenger compartment using the engine as a heat source has been issued; and
   the control device is configured to not limit execution of the power storage capacity decreasing control when the hybrid vehicle is predicted to be parked at the predetermined point and the heating request has been issued.

9. The hybrid vehicle according to claim 1, wherein the control device is configured to:
   i) determine whether parking at the predetermined point is predicted based on whether a destination is the predetermined point; and
   ii) acquire a destination which is predicted based on a traveling history by an external system when the destination has not been set by a user.

10. The hybrid vehicle according to claim 1, wherein the power storage device is configured to not be charged with electric power from an external power supply outside the hybrid vehicle.

11. The hybrid vehicle according to claim 1, wherein the power storage device is configured to be charged with electric power from an external power supply outside the hybrid vehicle; and
   wherein the predetermined point is a position at which the power storage device is predicted to not be charged with electric power from an external power supply outside the hybrid vehicle.

12. The hybrid vehicle according to claim 1, wherein in the current trip decreasing control of controlling the engine and the motor such that a power storage capacity of the power storage device is decreased to a predetermined state of charge when the next trip starts.

13. The hybrid vehicle according to claim 12, wherein in the next trip the power storage capacity recovering control of controlling the engine and the motor such that the power storage capacity of the power storage device is recovered to a second predetermined state of charge when the engine operates.

14. The hybrid vehicle according to claim 13, wherein the second state of charge is greater than the first state of charge.

15. A controller for a hybrid vehicle, the hybrid vehicle including an engine, a motor, and a power storage device configured to supply electric power to the motor and to be charged with electric power generated by the motor, the controller comprising an electronic control unit configured to:

i) automatically start and stop the engine;
ii) execute, in a current trip, a power storage capacity decreasing control of controlling the engine and the motor such that a power storage capacity of the power storage device in a case where the hybrid vehicle is predicted to be parked at a predetermined point is lower than a power storage capacity of the power storage device in a case where the hybrid vehicle is predicted to not be parked at the predetermined point, and execute, in a next trip, a power storage capacity recovering control of controlling the engine and the motor such that the power storage capacity of the power storage device is recovered when the engine operates; and
iii) limit execution of the power storage capacity decreasing control when the hybrid vehicle is predicted to be parked at the predetermined point is predicted and a stopping prohibiting condition for the engine is satisfied.

16. The controller for the hybrid vehicle of claim 15, wherein in the current trip decreasing control of controlling the engine and the motor such that a power storage capacity of the power storage device is decreased to a predetermined state of charge when the next trip starts.

17. The controller for the hybrid vehicle of claim 16, wherein in the next trip the power storage capacity recovering control of controlling the engine and the motor such that the power storage capacity of the power storage device is recovered to a second predetermined state of charge when the engine operates.

18. The controller for the hybrid vehicle of claim 17, wherein the second state of charge is greater than the first state of charge.

* * * * *

UNITED STATES PATENT AND TRADEMARK OFFICE
CERTIFICATE OF CORRECTION

PATENT NO. : 10,661,778 B2
APPLICATION NO. : 16/146037
DATED : May 26, 2020
INVENTOR(S) : Keisuke Morisaki It is certified that error appears in the above-identified patent and that said Letters Patent is hereby corrected as shown below:

On the Title Page

Item (72), inventor, address, delete "Toyota" and insert --Toyota-shi Aichi-ken--, therefor.

In the Specification

In Column 1, Line(s) 37, delete "charge," and insert --charge--, therefor.

In Column 2, Line(s) 28, delete "starling" and insert --starting--, therefor.

In Column 4, Line(s) 27, delete "stalling" and insert --starting--, therefor.

In Column 4, Line(s) 27, after "aspect", insert --,--.

In Column 4, Line(s) 31, delete "mid" and insert --and--, therefor.

In Column 4, Line(s) 39, delete "parting" and insert --parking--, therefor.

In Column 6, Line(s) 60, delete "input," and insert --input--, therefor.

In Column 7, Line(s) 26, delete "$\mathbf{W_{ont}}$" and insert --$\mathbf{W_{out}}$--, therefor.

In Column 7, Line(s) 53, delete "lake" and insert --like--, therefor.

In Column 7, Line(s) 63, delete "traffic," and insert --traffic--, therefor.

In Column 8, Line(s) 1, delete "toil" and insert --toll--, therefor.

In Column 8, Line(s) 15, delete "GPU" and insert --CPU--, therefor.

Signed and Sealed this
Twenty-fifth Day of August, 2020

Andrei Iancu
*Director of the United States Patent and Trademark Office*

CERTIFICATE OF CORRECTION (continued)
U.S. Pat. No. 10,661,778 B2

In Column 8, Line(s) 15, delete "front" and insert --from--, therefor.

In Column 8, Line(s) 50, delete "parking/" and insert --parking,--, therefor.

In Column 8, Line(s) 55, delete "terra" and insert --term--, therefor.

In Column 9, Line(s) 65, delete "that," and insert --that--, therefor.

In Column 11, Line(s) 3, after "Accordingly", insert --,--, therefor.

In Column 11, Line(s) 8, delete "tor" and insert --for--, therefor.

In Column 11, Line(s) 12, delete "tor" and insert --for--, therefor.

In Column 11, Line(s) 18, delete "$A_{ce}$" and insert --$A_{cc}$--, therefor.

In Column 13, Line(s) 42, after "recovering", delete ",".

In Column 14, Line(s) 15, delete "if" and insert --it--, therefor.

In Column 15, Line(s) 11, delete "$W_{ont}$" and insert --$W_{out}$--, therefor.

In Column 15, Line(s) 47, delete "hut" and insert --but--, therefor.

In Column 16, Line(s) 1, delete "regenerate" and insert --regenerable--, therefor.

In Column 16, Line(s) 29, delete "regenerate" and insert --regenerable--, therefor.

In Column 16, Line(s) 31, delete "hand. In" and insert --hand, in--, therefor.

In Column 16, Line(s) 44, after "operating", delete ",".

In Column 16, Line(s) 59, delete "if" and insert --it--, therefor.

In Column 17, Line(s) 9, delete "aid" and insert --and--, therefor.

In Column 17, Line(s) 41, delete "$W_{ont}$" and insert --$W_{out}$--, therefor.

In Column 17, Line(s) 53, delete "Upper" and insert --upper--, therefor.

In Column 17, Line(s) 57, after "permission", delete ",".

In Column 17, Line(s) 59, delete "tor" and insert --for--, therefor.

In Column 18, Line(s) 28 & 29, after "satisfaction", delete ",".

CERTIFICATE OF CORRECTION (continued)
U.S. Pat. No. 10,661,778 B2

In Column 18, Line(s) 32, after "Accordingly", insert --,--, therefor.

In Column 20, Line(s) 1, after "starting", delete ",".

In Column 20, Line(s) 4, delete "hut starting:" and insert --but starting--, therefor.

In Column 20, Line(s) 23, delete "20" and insert --70--, therefor.

In Column 20, Line(s) 43, after "parking", delete ",".